United States Patent
Muehl

(10) Patent No.: US 11,414,105 B2
(45) Date of Patent: Aug. 16, 2022

(54) BALLAST ARRANGEMENT FOR A RAIL VEHICLE, AND METHOD FOR PRODUCING A BALLAST DEVICE

(71) Applicant: SIEMENS MOBILITY GMBH, Munich (DE)

(72) Inventor: Franz Muehl, Freising (DE)

(73) Assignee: Siemens Mobility GmbH, Munich (DE)

( * ) Notice: Subject to any disclaimer, the term of this patent is extended or adjusted under 35 U.S.C. 154(b) by 215 days.

(21) Appl. No.: 16/639,221

(22) PCT Filed: May 18, 2018

(86) PCT No.: PCT/EP2018/063064
§ 371 (c)(1),
(2) Date: Feb. 14, 2020

(87) PCT Pub. No.: WO2019/034294
PCT Pub. Date: Feb. 21, 2019

(65) Prior Publication Data
US 2020/0198666 A1 Jun. 25, 2020

(30) Foreign Application Priority Data
Aug. 14, 2017 (DE) .............. 102017214140

(51) Int. Cl.
| | |
|---|---|
| *B61F 1/08* | (2006.01) |
| *B61C 15/06* | (2006.01) |
| *B61F 5/24* | (2006.01) |
| *B61F 1/06* | (2006.01) |
| *B62D 49/08* | (2006.01) |
| *B66C 23/72* | (2006.01) |

(52) U.S. Cl.
CPC ............... *B61F 1/08* (2013.01); *B61C 15/06* (2013.01); *B61F 1/06* (2013.01); *B61F 5/24* (2013.01); *B62D 49/085* (2013.01); *B66C 23/72* (2013.01)

(58) Field of Classification Search
CPC ...... B61F 1/06; B61F 1/08; B61F 5/24; B61C 15/00; B61C 15/04; B61C 15/045; B61C 15/06; B61C 15/14; B66C 23/72; B62D 49/085; B62D 49/0628; B62D 37/04; B28B 1/00–23/22; B28D 1/00–1/327
See application file for complete search history.

(56) References Cited

U.S. PATENT DOCUMENTS

| | | |
|---|---|---|
| 1,835,673 A | 12/1931 | Sheehan |
| 2,942,558 A | 6/1960 | Speicher |
| (Continued) | | |

FOREIGN PATENT DOCUMENTS

| | | |
|---|---|---|
| DE | 1845830 U | 2/1962 |
| DE | 1455141 B1 | 9/1969 |
| (Continued) | | |

*Primary Examiner* — S. Joseph Morano
*Assistant Examiner* — Cheng Lin
(74) *Attorney, Agent, or Firm* — Lauremce A. Greenberg; Werner H. Stemer; Ralph E. Locher

(57) ABSTRACT

A ballast arrangement for a rail vehicle includes at least one ballast device. The at least one ballast device has a concrete weight body, at least one built-in metal reinforcement, and at least one securing device built into the weight body. There is also described a method for producing a ballast arrangement according to the invention.

5 Claims, 2 Drawing Sheets

(56) References Cited

U.S. PATENT DOCUMENTS

| | | | |
|---|---|---|---|
| 4,088,077 A | 5/1978 | von Beckmann | |
| 4,660,344 A * | 4/1987 | Gaudelli | B28B 7/08 |
| | | | 404/7 |
| 4,971,356 A * | 11/1990 | Cook | B62D 37/04 |
| | | | 280/759 |
| 7,281,737 B2 * | 10/2007 | Ellis | B60P 1/00 |
| | | | 224/403 |
| 7,618,062 B2 * | 11/2009 | Hamm | B62D 49/085 |
| | | | 280/759 |
| 8,960,460 B2 * | 2/2015 | Mentink | B66C 23/76 |
| | | | 212/197 |

FOREIGN PATENT DOCUMENTS

| | | | | |
|---|---|---|---|---|
| DE | 2711250 A1 | | 9/1977 | |
| DE | 3023382 A1 | | 1/1982 | |
| DE | 202008006356 U1 | * | 10/2009 | ............ B66C 23/72 |
| DE | 202011103854 U1 | | 8/2011 | |
| DE | 202011103854 U1 | * | 8/2011 | ............ C04B 28/04 |
| DE | 102015120650 A1 | * | 6/2017 | ............ B66C 23/72 |
| DE | 102015120650 A1 | | 6/2017 | |
| EP | 2165910 A1 | | 3/2010 | |
| EP | 2165910 A1 | * | 3/2010 | ............... B61F 5/24 |
| EP | 2426078 A2 | * | 3/2012 | ............ B66C 23/72 |
| GB | 908886 A | | 10/1962 | |
| JP | 2006137238 A | | 6/2006 | |
| JP | 2012210190 A | * | 11/2012 | |
| SU | 160812 A1 | | 2/1964 | |
| SU | 1183629 A1 | | 10/1985 | |

\* cited by examiner

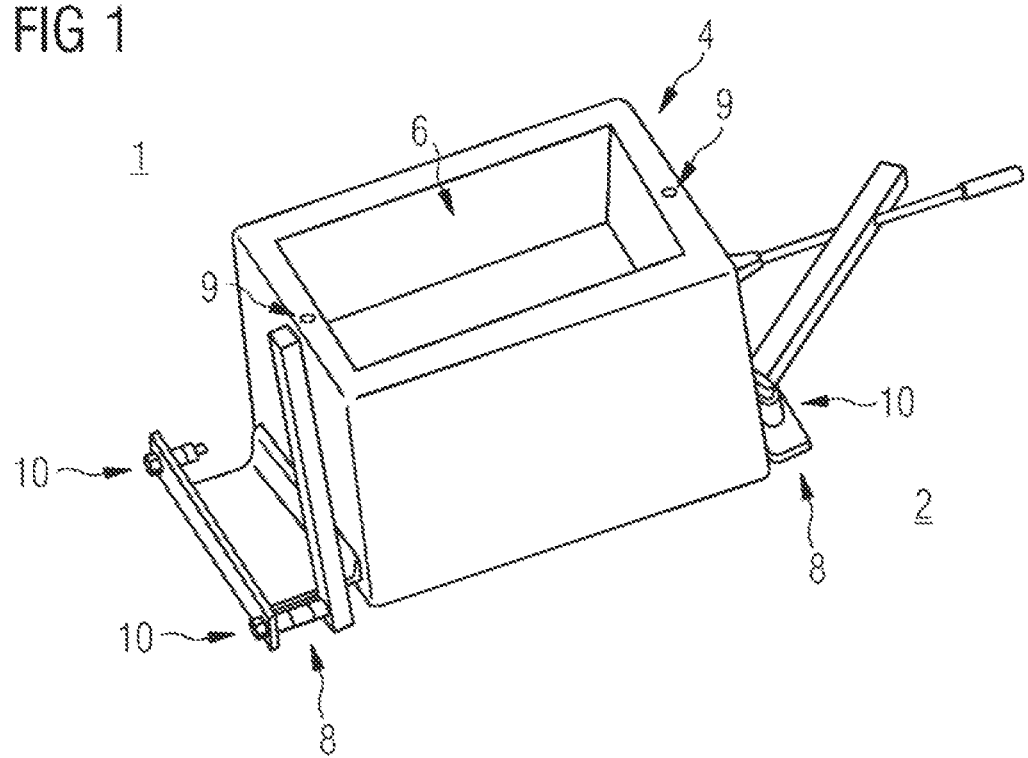
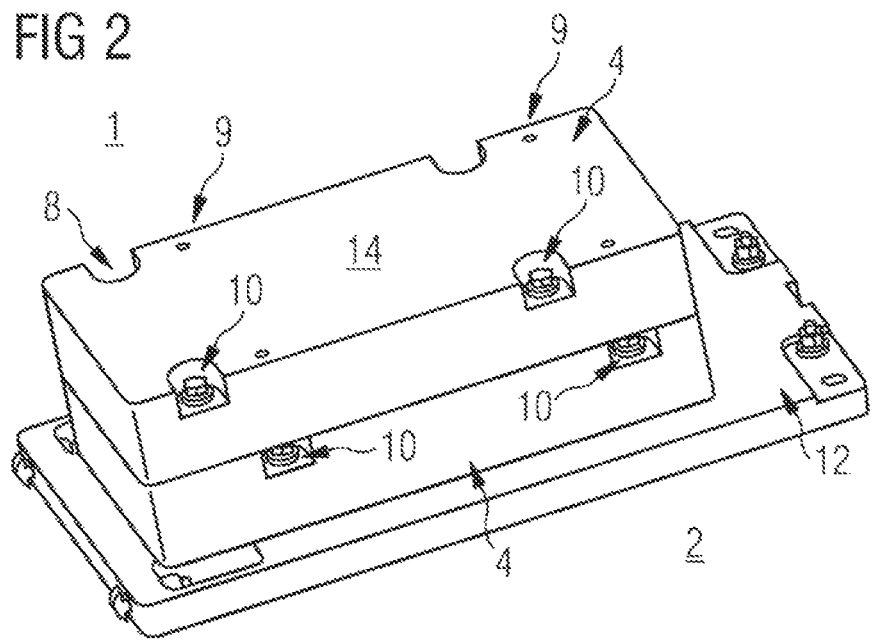

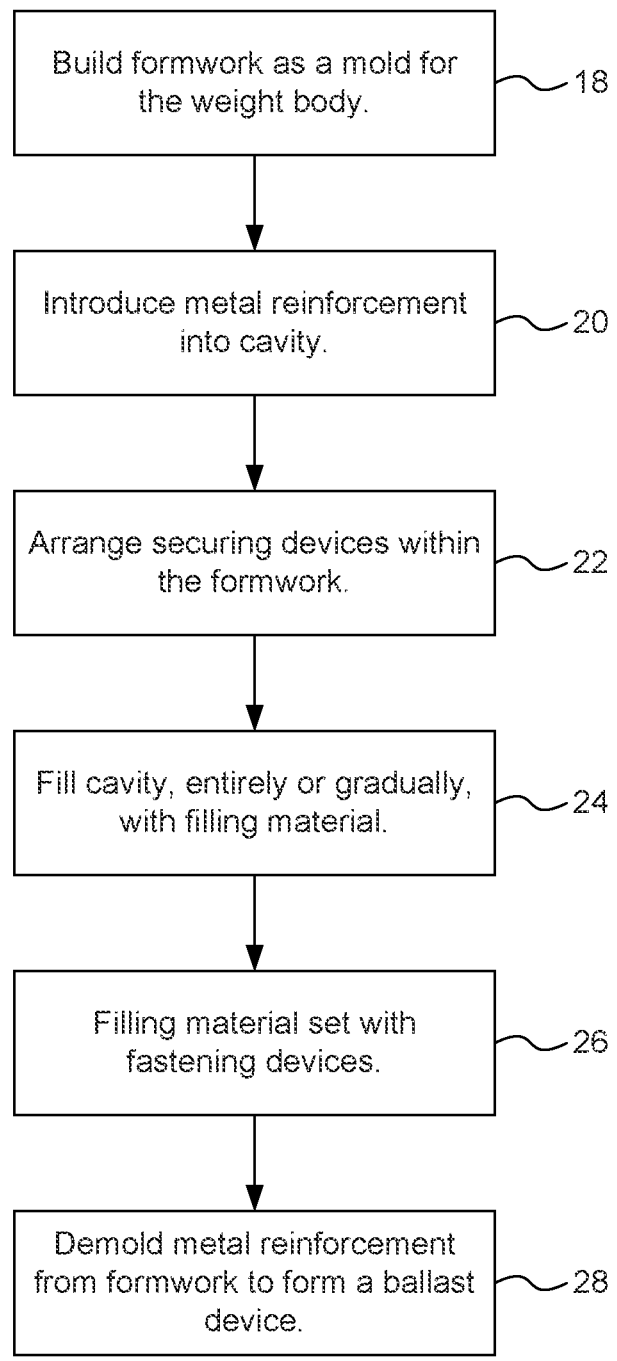

BALLAST ARRANGEMENT FOR A RAIL VEHICLE, AND METHOD FOR PRODUCING A BALLAST DEVICE

BACKGROUND OF THE INVENTION

Field of the Invention

The invention relates to a ballast arrangement for a rail vehicle, having at least one ballast device, in which the at least one ballast device has a concrete weight body, at least one integrated metal reinforcement and at least one securing device integrated into the weight body. Furthermore, the invention relates to a method for producing a ballast arrangement according to the invention.

Unlike in conventional road vehicles, in rail vehicles it is necessary, in order to maintain tractive forces of the rail vehicle, for a rail vehicle to have a minimum weight and for the loading of the drive wheels to be distributed uniformly and to be adaptable to the load to be transported, in order to achieve the frictional forces transmitted by the drive wheels. In order to achieve this minimum weight, ballast weights, usually in the form of permanently installed steel plates, are built into rail vehicles. The ballast weights represent both a cost factor and a space factor. There is only limited room in rail vehicles, since the space is required for items of equipment and accessories. In rail transport, high acceleration forces arise in particular in the direction of travel. In order to avoid tipping of the ballast weight, ballast materials with a high density are used, such that the ballast bodies can be configured in as compact a manner as possible. The steel plates hitherto used for this purpose, which are usually installed permanently in the rail vehicles, are costly, however.

Alternatively, the sheet thickness used is increased locally in the rail vehicle or solid slabs are used instead of welded hollow sections. However, these do not afford the necessary flexibility in order to be variably settable in an appropriate manner under different loads on the rail vehicle.

SUMMARY OF THE INVENTION

An object of the invention is to propose a variable and inexpensive ballast arrangement for a rail vehicle. Furthermore, an object of the invention is to propose a method for producing such a ballast arrangement.

The object is achieved by the subject matter as claimed in the independent claim(s). Advantageous configurations of the invention are the subject matter of respectively dependent claims.

According to one aspect of the invention, a ballast arrangement for a rail vehicle, having at least one ballast device, is provided. The at least one ballast device has a concrete weight body, at least one integrated metal reinforcement and at least one securing device integrated into the weight body.

A ballast device consists here of a concrete body having an integrated metal reinforcement. In this case, one or more securing devices may have been introduced into the concrete body. The securing devices can in this case be configured differently or be of the same type. As a result of the ballast arrangement according to the invention, large quantities of costly steel can be replaced with comparatively cost-effective concrete. In this way, considerable cost savings can be made.

The integration of a metal reinforcement into the at least one ballast device can in this case increase the strength and loadability of the ballast device. Furthermore, integration of the at least one securing device into at least one ballast device can make it possible to attach tools, accessories, items of equipment or further ballast devices. In this way, the ballast arrangement can be integrated into the rail vehicle or secured to the rail vehicle in a particularly space-saving manner.

A compact ballast arrangement makes it possible, on account of a small overall height, to make the free space or free surfaces above and on the ballast arrangement useful in other ways. For example, the room can be used as a store or receiving area for items of equipment or tools. Compared with the steel variant, there is a considerable cost reduction by about 50 percent, with additionally achieved variability of the ballast arrangement through the possible introduction or removal of individual ballast devices or a plurality of ballast devices. In this case, the ballast arrangement has only a small space requirement and, on account of the at least one securing device, makes it possible to attach items of equipment and required accessories.

According to a further embodiment, the weight body of the ballast device is configured in a planar manner. Planar should be understood here as meaning a rectangular or platelike basic shape, wherein the largest areas can be arranged parallel to an underfloor or floor of the rail vehicle. Alternatively, the ballast device can also be embodied in the form of a trough for receiving accessories. As a result of the planar shape of one or more ballast devices, if there is the need for a ballast arrangement with a relatively large mass, a plurality of ballast devices can be arranged one above another, and thus a desired balancing weight can be set in a precise manner.

According to a further embodiment, a plurality of ballast devices are able to be secured together and/or to the rail vehicle in a variable manner one on top of another or alongside one another. The ballast devices can in this case be arranged flexibly on one another and/or on the rail vehicle. Alternatively, in the case of a plurality of ballast devices stacked one on top of another, the bottommost ballast device can be connected to the rail vehicle and to a further ballast device. All further stacked ballast devices can each be connected to a ballast device located beneath them and a ballast device located above them. Suitable for connecting the ballast devices are for example through-holes for screw connections or plug connections and corresponding threaded sleeves or receptacles. Depending on the requirements and the necessary weight load, it is thus possible to make an individual adaptation.

According to a further exemplary embodiment of the ballast arrangement, tools or items of equipment are able to be secured to the ballast device by the at least one integrated securing device. As a result of the relatively simple shaping, the weight body can be embodied both as a simple for example rectangular weight body without further additional functions and for example as a weight body with integrated pockets or as a concrete trough, wherein the pockets may be suitable for receiving accessory parts. As a result of the introduction of further securing elements into the ballast device, it is possible to mount further items of equipment on the weight body and at least one surface of the weight body can additionally be used for the positioning or storage of items of equipment.

According to a further exemplary embodiment, the at least one securing device is a threaded bushing, a through-hole, a securing rail, a pocket-like indentation, a hook or an eyelet. The at least one securing device can be arranged for example on a top side, an underside or a side of a ballast device that extends parallel to the side walls of the rail vehicle. It is thus possible for ballast devices that are arranged alongside one another and one on top of another to be mounted on the rail vehicle. The at least one securing device can also be one or more through-holes for guiding screws or threaded rods, which can secure the at least one ballast device to the rail vehicle in a force-fitting or frictional manner. It is also possible for a plurality of different securing devices to be arranged on a ballast device. For example, a first ballast device can be secured to the rail vehicle by screws guided through through-holes. The first ballast device can have threaded sleeves for receiving a second ballast device, wherein the second ballast device can have only through-holes for screwing the second ballast device to the first ballast device.

According to a further embodiment, the at least one securing device is made of steel or concrete. The securing device can also be a compartment introduced into the ballast device, a recess or a pocket. Items of equipment or tools can be introduced and fixed from the outside, for example using a strap. Alternatively, threaded sleeves or eyelets made of metal, for example steel, may have been introduced into the concrete. The securing devices can be connected to the metal reinforcement in a force-fitting, materially bonded or a form-fitting manner, such that a robust connection of the ballast devices is possible.

According to a further exemplary embodiment, the at least one ballast device has an identifier relating to its mass. In particular, interchangeable ballast devices can be marked by different colors, identification numbers, symbols or measuring units as per their mass. The identifiers can in this case be painted onto a coating of the ballast device or directly onto the weight body of the ballast device. Alternatively, the identifiers may have been cast or embossed into the concrete of the weight body.

According to a further exemplary embodiment, the at least one ballast device is coated or painted. The ballast devices can be adapted in terms of color to the shade of adjacent components by paint. When the ballast device is fitted under the rail transport vehicle, the ballast device can be provided with a shock-absorbing outer layer made of a plastics coating, in order to protect the concrete surface from damage, for example by flying gravel. Such a coating can be for example a thick-film plastics coating, which may be differently colored depending on the mass of the ballast device. Alternatively, the thick-film plastics coating can have a unitary color matching the equipment of the rail vehicle for all ballast devices.

According to a further aspect of the invention, a method for producing a ballast device for a rail vehicle, for arranging in a ballast arrangement according to the invention, is provided. In one step, a formwork is built. The built formwork has a cavity for receiving a filling material. Subsequently, a metal reinforcement is introduced into the cavity. In a further step, at least one securing device is introduced. Following the provision of an at least concrete-containing filling material, the cavity of the formwork is filled with the filling material. After the filling material has set to form a ballast device in the formwork, the formwork can be removed from the ballast device.

The formwork can consist for example of wood or a glass fiber reinforced plastic. As a result, ballast devices can be produced in multifarious forms, including thin-walled forms. For example, a minimum wall thickness or thickness of the ballast device of 40 mm can be achieved. Alternatively or in addition, a formwork can also consist of metal and, after being filled with the filling material, remain on the ballast body or the ballast device after setting. In this case, the securing device may have been secured to the outside of the metal formwork and the reinforcement of the ballast body secured to the inside of the metal formwork, thereby ensuring a flow of force from the at least one securing device, through the formwork, into the reinforcement. As a result of securing devices being introduced into the ballast device, the ballast device can be fitted both in the rail vehicle and under the rail vehicle. In particular, it is also possible for a plurality of ballast devices to be connected mechanically together and to be stacked one on top of another. As a result, a required mass can be set precisely by a plurality of ballast devices.

As a result of the ballast device being produced from concrete or a concrete mixture, production can be economical even in the case of small quantities. In the case of larger quantities, it is possible for example for a mold or formwork made of glass fiber reinforced plastic to be used. For simply shaped ballast devices, a formwork made of wood may be sufficient. A formwork can be adapted or altered in a technically simple manner. The filling material can likewise be adapted in a technically simple and flexible manner in order to set particular material properties of a ballast device. As a result, it is also possible for prototypes and individually manufactured ballast devices to be produced inexpensively and quickly.

In the production method, securing devices can be arranged in the filling material individually and depending on the requirements made of the ballast device.

As a result of the method, both production costs and material costs of ballast devices can be reduced.

According to a further exemplary embodiment of the method, a normal concrete, a heavy concrete or a mixture of normal concrete and heavy concrete is used as the filling material. The mass of the weight body of the ballast device can be increased, when use is made of normal concrete with a usual dry bulk density without a metal reinforcement, from about 2000 and 2600 kg/m$^3$ to about 4500 kg/m$^3$ in mass by using heavy concrete with a usual dry bulk density without a metal reinforcement.

As a result of the use of a heavy aggregate, for example magnetite or any desired mixture of normal and heavy concrete, the density of the weight body can be influenced in a targeted manner and the mass of the weight body controlled during production. As a result, the weight bodies, cast in a single formwork, of the ballast device can fulfill different ballasting and balancing tasks given constant installation conditions and a constant space requirement.

According to a further embodiment of the method, a density of the filling material is increased by at least one additive while the filling material is being mixed. Preferably, one or more materials having a higher density than the filling material can be used. As a result, the ballast device can be formed in a more compact manner by a higher density while having a constant mass. Alternatively or additionally, fillers can be admixed to change chemical properties of concrete. Thus, various properties, for example a higher strength, can be set. As a result, the ballast device can be optimized with regard to different possible uses.

According to a further embodiment of the method, steel shot and/or magnetite is used as the at least one additive. Alternatively or additionally, it is also possible for constituents made of cast iron to be added to the filling material. Additional metal plates can result in a further increase in the mass of the ballast device. Furthermore, it is also possible for recycled metal or rock to be admixed to the filling material. In this way, a mass of the ballast device can be set in a targeted manner.

According to a further embodiment of the method, the same formwork is used to produce a plurality of ballast devices. As a result, the formwork can be embodied in a reusable manner. Preferably, the formwork can be coated with a release agent before being filled with the filling material. As a result, the ballast device can be demolded more easily and damage to the formwork during demolding of the ballast device can be avoided. In particular, it is possible to realize cost-effective production of the ballast device as a result, since it is not necessary to repeatedly produce the formwork. As a result of repeated use of the formwork, the dimensions of the ballast devices produced can remain constant. Variation in the dimensions as a result of the formwork being produced anew can be ruled out.

According to a further embodiment of the method, the ballast device is coated with a plastics coating or paint.

After the filling material has set and a solid ballast device has been formed, the ballast device can, in a further method step, be coated at least in a visible region with a coat of paint or a plastics layer. In particular, a ballast device can be matched in terms of color to adjacent components of the rail vehicle. In the visible region, the ballast device can have for example a slight roughness and thus be fitted without paint or a coating. The visible regions of the ballast device can be for example side faces of the ballast device.

The above-described properties, features and advantages of this invention and the manner in which these are achieved will become clearer and more clearly understandable from the explanation of the following highly simplified schematic illustrations of preferred exemplary embodiments.

BRIEF DESCRIPTION OF THE SEVERAL VIEWS OF THE DRAWING

FIG. 1 shows a perspective illustration of a ballast arrangement according to a first exemplary embodiment, FIG. 2 shows a perspective illustration of a ballast arrangement according to a second exemplary embodiment, and FIG. 3 shows a schematic flow chart of a method for producing a ballast device according to one embodiment.

DETAILED DESCRIPTION OF THE INVENTION

In the figures, the same structural elements each have the same reference numerals.

FIG. 1 shows a perspective illustration of a ballast arrangement 1 for a rail vehicle 2 according to a first exemplary embodiment. Illustrated in particular is a detail of an underside of a rail vehicle 2, on which the ballast arrangement 1 is arranged. The ballast arrangement 1 serves to balance a mass distribution along the rail vehicle 2, such that the running behavior of the rail vehicle 2 can be optimized by a uniform mass distribution.

According to the first exemplary embodiment, the ballast device 1 has a ballast device 4. The ballast device 4 is rectangular in shape and has a concrete weight body coated with a plastics coating. The ballast device 4 has a metal reinforcement (not illustrated) for mechanically reinforcing the weight body of the ballast device 4.

The ballast device 4 is embodied here with a trough-like recess 6. Thus, the ballast device 4, in addition to locally increasing a mass of the rail vehicle 2, can be used as a storage compartment. Introduced into the plastics-coated weight body in a materially bonded manner on two opposite sides of the ballast device 4 are respective securing devices 8 having two screw connections 10. The securing devices 8 in this case project into the weight body of the ballast device 4 and can be welded to or screwed together with the metal reinforcement of the weight body.

The securing devices 8 are metal plates 10 having introduced threads or bores for receiving screws 10. Via the screw connections 10, the ballast device 4 can be mechanically connected to the rail vehicle 2. On a free surface of the ballast device 4, two threaded sleeves 9 have been introduced into the weight body as additional securing devices 8 for receiving screws and for attaching further ballast devices 4.

FIG. 2 illustrates a perspective illustration of a ballast arrangement 1 on an underside of a rail vehicle 2 according to a second exemplary embodiment. Secured to the underside of the rail vehicle 2 is a steel plate 12 made of cast steel. Secured to the steel plate 12 by screw connections 10 are two planar ballast devices 4. The ballast devices 4 have through-openings 8 (not illustrated for clarity reasons) as securing means 8 for receiving the screw connections 10. Four through-openings 8 are arranged in each ballast device 4.

In addition to the through-openings 8 as securing means 8, the ballast devices 4 each have four threaded sleeves 9 that are arranged in a spatially offset manner with respect to the through-openings 8. The threaded sleeves 9 are likewise securing devices 8 of the ballast devices 4. The threaded sleeves 9 are cast, parallel to the through-openings 8, into the weight bodies produced from concrete. In particular, the threaded sleeves 9 and the through-openings 8 realized in the form of sleeves can be connected to the metal reinforcement of the weight body, such that a robust and vibration-resistant connection of a plurality of ballast devices 4 is made possible.

The through-openings 8 and the threaded sleeves 9 have in this case been introduced into the ballast devices 4 such that, after a planar ballast device 4 has been rotated through 180° along its planar extent or its contact surfaces 14 with respect to another planar ballast device 4, the through-openings 8 in one ballast device 4 are arranged over the threaded sleeves of the second ballast device 4. As a result, the first ballast device 4 can be screwed together with the second ballast device 4 by screws 10. In particular, as a result of such an arrangement of threaded sleeves 9 and through-openings 8, as many ballast devices 4 as desired can be stacked one on top of another and secured together by screws 10. For this purpose, the ballast devices 4 each have, in the region of the through-openings 8, a recess for receiving a screw head of a screw 10. In this way, flat support surfaces 14 between two ballast devices 4 and a durable connection of the ballast devices 4 can be made possible.

According to the second exemplary embodiment, the ballast devices 4 have a coat of colored paint for signaling a mass of the respective ballast devices 4. In order to secure the ballast devices 4 to the steel plate 12, threads, corresponding to the through-openings 8 in the ballast device 4, for receiving screws 10 and for securing a ballast device 4 to the steel plate 12 have been introduced.

FIG. 3 shows a schematic flow chart of a method 16 for producing a ballast device 4 for a rail vehicle 2 according to one embodiment. In a first step, a formwork is built 18 as a mold for the weight body, to be produced from concrete, of the ballast device 4.

A cavity for forming a shape of the weight body arises in the built formwork. A metal reinforcement is introduced into the cavity 20.

In a further step, the securing devices 8, 8 are arranged within the formwork 22. The securing devices 8, 9 can be connected together by a mask or a frame in this case, so as to make it possible to introduce the securing devices 8, 9 into the weight body quickly and in an automated manner. In particular, the securing devices 8, 9 can have spacer elements with respect to the formwork. Preferably, the filling material is still deformable during this step of the method 16. Alternatively, the securing devices 8, 9 can be arranged together with the metal reinforcement in the cavity of the formwork before the filling material is introduced.

In a further step of the method 16, a filling material consisting of at least one concrete is provided and is poured into the formwork with the metal reinforcement introduced into the cavity. In this case, the cavity is entirely or gradually filled with the filling material 24.

In final steps of the method 16, the filling material can set 26 with the fastening devices 8, 9 and the metal reinforcement to form a ballast device 4 and be demolded from the formwork 28.

Although the invention has been described in detail and illustrated more specifically by the preferred exemplary embodiments, the invention is not limited by the disclosed examples and other variations can be derived therefrom by a person skilled in the art without departing from the scope of protection of the invention.

The invention claimed is:

1. A method for producing a ballast device for a rail vehicle to be arranged in a ballast arrangement, the method comprising:

preparing a formwork;

introducing a metal reinforcement into a cavity of the formwork;

introducing at least one securing device into the formwork and attaching the at least one securing device to the metal reinforcement, the at least one securing device being configured to be integrated into the ballast device and for attaching further ballast arrangements, providing a filling material consisting of a mixture of concrete components, including a normal concrete component and a heavy concrete component, and selectively mixing a ratio of normal and heavy concrete components to influence a density of the weight body and to control a mass of the ballast device so that a finished ballast device fulfills different ballasting and balancing tasks in dependence of the ratio while retaining constant installation conditions and constant space requirements independent of the ratio;

filling the filling material into the cavity of the formwork; and allowing the filling material to set so as to form a ballast device in the formwork, and subsequently removing the formwork from the ballast device.

2. The method according to claim 1, which comprises mixing the filling material and increasing a density of the filling material by adding at least one additive while the filling material is being mixed.

3. The method according to claim 2, which comprises adding at least one a additive selected from the group consisting of steel shot and magnetite.

4. The method according to claim 1, which comprises using the formwork to produce a plurality of ballast devices.

5. The method according to claim 1, which comprises coating the ballast device with a plastics coating or with paint.

* * * * *